US012646508B2

(12) United States Patent
Furusawa

(10) Patent No.: US 12,646,508 B2
(45) Date of Patent: Jun. 2, 2026

(54) INFORMATION PROCESSING DEVICE

(71) Applicant: TOYOTA JIDOSHA KABUSHIKI KAISHA, Toyota (JP)

(72) Inventor: Toru Furusawa, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 18/663,281

(22) Filed: May 14, 2024

(65) Prior Publication Data

US 2025/0118296 A1 Apr. 10, 2025

(30) Foreign Application Priority Data

Oct. 5, 2023 (JP) ................................. 2023-173831

(51) Int. Cl.
*G10L 15/183* (2013.01)
*G10L 15/06* (2013.01)
*G10L 15/26* (2006.01)

(52) U.S. Cl.
CPC .......... *G10L 15/183* (2013.01); *G10L 15/063* (2013.01); *G10L 15/26* (2013.01)

(58) Field of Classification Search
CPC ..... G10L 15/183; G10L 15/063; G10L 15/26; G10L 15/1822; G06F 40/20; G06F 40/30; G06F 40/35
See application file for complete search history.

(56) References Cited

U.S. PATENT DOCUMENTS

2016/0342682 A1* 11/2016 Moreno Mengibar ......................
G10L 15/24
2023/0123574 A1* 4/2023 Guberman ............. G06Q 10/10
704/9

FOREIGN PATENT DOCUMENTS

JP 6555838 B1 8/2019
JP 2020-098308 A 6/2020

* cited by examiner

*Primary Examiner* — Linda Wong
(74) *Attorney, Agent, or Firm* — SoraIP, Inc.

(57) ABSTRACT

A prompt text including a list of a plurality of first language models each specialized for intention understanding in a plurality of predetermined domains and a content of the utterance is generated, the prompt text is input to a second language model, the first language model having a domain corresponding to the content of the utterance is identified based on the content of the response obtained from the second language model, and the content of the utterance is transferred to the identified first language model.

5 Claims, 5 Drawing Sheets

■ PROMPT TEXT ENTERED IN THE GATEWAY LANGUAGE MODEL

SEVERAL DOMAIN LLM ARE RUNNING, AS SHOWN BELOW,
AND EACH DOMAIN LLM HAS AN AREA OF EXPERTISE IN CONVERSATION,
AS DESCRIBED.
DETERMINE WHICH DOMAIN LLM SHOULD BE FORWARDED FROM
THE USER AND ANSWER ONLY THE NAME OF THE DOMAIN LLM.

\# OPERATIONAL DOMAIN-DOMAIN LLM AND AREAS OF EXPERTISE
- VEHICLE LLM (DETERMINE IN-VEHICLE STATUS AND SET IN-VEHICLE
  EQUIPMENT. CAR OWNER'S MANUAL LEARNED)
- CHAT LLM (CAN TALK THAT DOES NOT BELONG TO A PARTICULAR
  CATEGORY)
- REGIONAL INFORMATION LLM (INCLUDING TOURIST INFORMATION,
  WHICH CAN PROVIDE INFORMATION ON SURROUNDING AREAS)
- LOCAL LLM (DEALING WITH TOPICS THAT DO NOT APPLY TO THE ABOVE)

\# INPUT FROM THE USER
THE METER HAS AN UNFAMILIAR LAMP, BUT I WANT TO KNOW WHAT IT MEANS.
IT HAS A SHAPE WITH A SURPRISING MARK INSIDE THE POT.

■ ANSWERS FROM THE GATEWAY LANGUAGE MODEL

VEHICLE LLM

FIG. 5B

■ PROMPTED TEXT FOR THE CAR LLM

THE METER HAS AN UNFAMILIAR LAMP, BUT I WANT TO KNOW WHAT IT MEANS.
IT HAS SHAPE WITH SURPRISING MARK INSIDE THE POT.

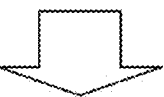

■ ANSWERS FROM THE CAR LLM

PNEUMATIC WARNING LIGHT IS POSSIBLE.
CHECK THE TIRE PRESSURE.

INFORMATION PROCESSING DEVICE

CROSS-REFERENCE TO RELATED APPLICATION

This application claims priority to Japanese Patent Application No. 2023-173831 filed on Oct. 5, 2023, incorporated herein by reference in its entirety.

BACKGROUND

1. Technical Field

The present disclosure relates to dialog technology.

2. Description of Related Art

There is technology in which a chatbot generates an answer based on an input sentence. In this regard, for example, Japanese Patent No. 6555838 discloses a system for selecting a chatbot suitable for an input question in an environment in which a plurality of chatbots is accessible.

SUMMARY

An object of the present disclosure is to provide highly accurate dialog while suppressing costs.

An aspect of an embodiment according to the present disclosure is an information processing device, including a control unit that executes recognizing content of an utterance made by a user, generating a prompt text including a list of a plurality of first language models respectively specialized for intention understanding in a plurality of predetermined domains, and the content of the utterance, inputting the prompt text into a second language model, and identifying the first language model possessing a domain corresponding to the content of the utterance, based on content of a response obtained from the second language model, and transferring the content of the utterance to the first language model that is identified.

Also, examples of other aspects include a method executed by the above device, a program for causing a computer to execute the method, and a computer-readable storage medium storing the program in a non-transitory manner.

According to the present disclosure, highly accurate dialog can be provided while suppressing costs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram illustrating a flow of processing executed by the control unit 11 of the in-vehicle device 10;

FIG. 5A is an exemplary prompt text generated by the dialog relay unit 112;

FIG. 5B is an exemplary prompt text generated by the dialog relay unit 112; and

DETAILED DESCRIPTION OF EMBODIMENTS

Figure 1A:
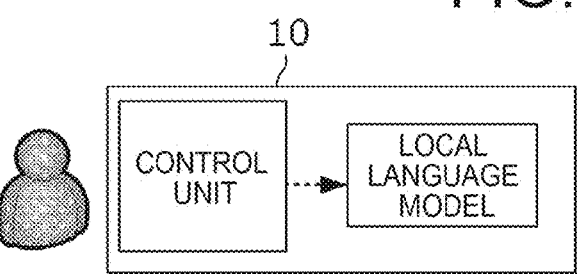
FIG. 1A is a schematic diagram of a dialog system according to a first embodiment.

In recent years, with the development of machine learning, products equipped with language models are increasing. For example, by incorporating a Large Language Model (LLM) that is improved in accuracy by machine-learning using a large-scale data set into a product, it is possible to add a natural-language dialog function to the target product.

A useful example of a natural language dialog is an automobile. For example, by mounting a LLM on an in-vehicle device, it is possible to obtain data without operating a touch panel or the like. Such a function is particularly useful in situations where the hand cannot be released, such as during traveling.

On the other hand, a learned LLM has a large capacity and is difficult to be mounted on an embedded device due to a cost-related problem. Therefore, a method of accessing a LLM via a network has been devised. By accessing LLM over the network, a large-scale language model that cannot be mounted on the local storage can be used.

In addition, it is possible to selectively access a LLM specialized in a certain field through a network. For example, when a plurality of LLMs is provided, such as a LLM specializing in route guidance, a LLM specializing in guidance of regional information, and a LLM specializing in chatting, a LLM suited to the user's intent can be selected. In this regard, a technique is known in which a category of an utterance is determined based on a content of an utterance of a user, and a LLM suitable for the category is automatically selected.

However, when a plurality of LLMs is selectively used, it is difficult to select a LLM that best matches the utterance of the user. For example, consider a case where a rule such as "selecting a route guidance LLM when a keyword such as "a route" or "(a name of a destination)" is detected from an utterance of a user" is set. However, in such a rule-based method, for example, would it be possible to arrive at ○○ by ○? It is not possible to deal with an ambiguous utterance that does not follow the rule, such as" There is also a method of allowing a user to select a category of an utterance, but this method impairs the user experience. An information processing device according to the present disclosure solves such a problem.

An information processing device according to a first aspect of the present disclosure includes a control unit that executes: generating a prompt text including a list of a plurality of first language models each specialized for intention understanding in a plurality of predetermined domains; and a content of the utterance; inputting the prompt text into a second language model; identifying the first language model having a domain corresponding to the content of the utterance based on the content of the response obtained from the second language model; and transferring the content of the utterance to the identified first language model.

Each of the plurality of first language models is a language model specialized for intention understanding in each of the plurality of domains. The first language model may be a Large Language Model (LLM). The large-scale language model is, for example, a language model learned so as to be capable of executing a dialog task in a natural language. The plurality of domains is, for example, source domains such as "route guidance", "vehicle guidance", "tourist guidance", and "chat".

The control unit generates a prompt text including a list of the first language models and the content (utterance sentence) of the utterance performed by the user. The prompt text may inquire, for example, in a natural language, which of the plurality of first language models is most suitable for inputting the content of the utterance performed by the user. The list of first language models may include, for example, an identifier or name of the first language model and a feature of each language model (e.g., a sentence describing the domain in which each language model is specialized).

The generated prompt text is input to the second language model. The second language model is a language model that is similar to the first language model and is capable of executing a dialog task in a natural language, but is a language model that is generated at a relatively low cost and does not perform learning specialized for a specific domain. The second language model answers a language model that is estimated to be most related to the content of the utterance based on the list of the first language models and the utterance sentence. The control unit connects to the answered first language model and transfers the content of the utterance.

According to such a configuration, it is possible to accurately identify the language model to which the utterance is to be transferred at a lower cost. Further, by executing such a process in the background, it is possible to perform the dialog smoothly.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

First Embodiment

Summary of System

An outline of the dialog system according to the first embodiment will be described. The dialog system according to the present embodiment includes an in-vehicle device 10 mounted on a vehicle. The in-vehicle device 10 can access other external devices that provide a dialog service based on a predetermined language model via a network (for example, a mobile communication network).

The in-vehicle device 10 is mounted on a connected vehicle capable of communicating with an arbitrary device via wireless communication. The in-vehicle device 10 may be a data communication module (DCM) for connecting a component (for example, a ECU, an in-vehicle terminal, or the like) of a vehicle to a network. In the present embodiment, the in-vehicle device 10 can access the Internet via a predetermined mobile communication network and connect to an external device that provides a dialog service.

The vehicle (or a component mounted on the vehicle) can provide various services by communicating with an external device via the in-vehicle device 10. Examples of the various services include a navigation service, a remote control (e.g., remote air conditioning) service, an in-vehicle Wi-Fi (registered trademark) service, and an emergency notification service.

Further, the in-vehicle device 10 has an audio input/output function, and can perform dialog with an occupant of the vehicle in a natural language.

FIG. 1A is a schematic diagram illustrating an in-vehicle device 10 according to a conventional form. The in-vehicle device 10 includes a control unit for inputting/outputting speech and performing speech recognition, and a local language model. The local language model is a language model learned so as to be able to have dialog with the natural language. The local language model may provide, for example, predetermined functions such as route searching and operation of a vehicle (such as an air conditioner) via dialog. In the illustrated embodiment, the local language model is stored in a storage device of the in-vehicle device 10.

On the other hand, in such a form, it is difficult to provide a large-scale language model. For example, there are various categories of dialog, such as regional information, tourist guidance, information on vehicles (operation manuals), and chat, but in order to cover all of these categories, it is necessary to prepare a language model learned by using large-scale learning data. Such language models can range in size from several gigabytes to hundreds of gigabytes, and storing them in local storage is not practical in terms of cost.

Figure 1B:
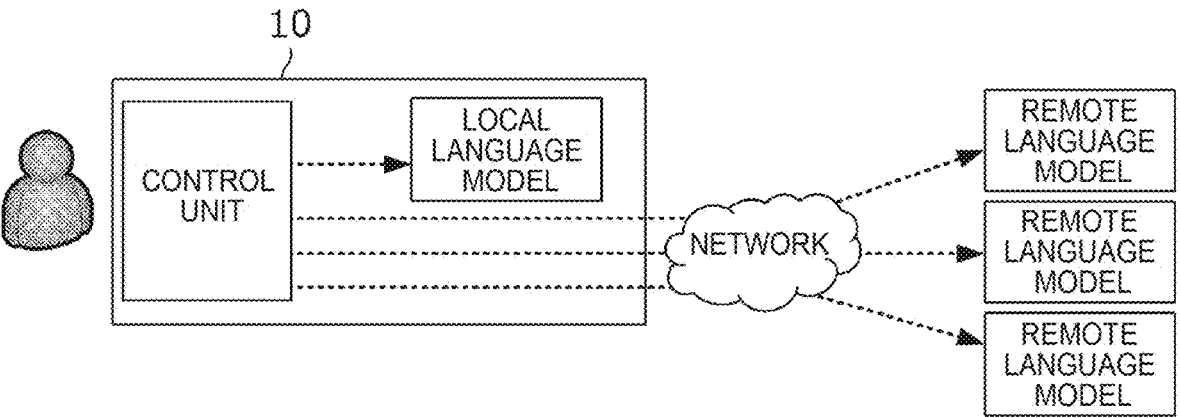
FIG. 1B is a schematic diagram of a dialog system according to a first embodiment.

Therefore, a system that accesses a language model specialized for dialog in a specific domain via a network has also been proposed. FIG. 1B is a schematic diagram of a form in which a plurality of language models (hereinafter referred to as remote language models) provided on the Internet are accessible from an in-vehicle device 10 in addition to a local language model. For example, a configuration is conceivable in which a plurality of remote language models in which learning specialized in a specific domain is performed is stored in an external device connected to the Internet, and the remote language models are accessed from the in-vehicle device 10 in response to a request.

However, in this configuration, there is a problem that it is difficult to accurately determine the language model of the connection destination. For example, the control unit of the in-vehicle device 10 can determine the language model of the connection destination (that is, the language model corresponding to the category of the utterance) according to the content of the utterance made by the occupant of the vehicle. However, since the utterance made by the occupant of the vehicle is a natural language, an appropriate language model is not necessarily selected.

As a method of determining the category of the utterance based on the content of the utterance, there is a rule-based method. For example, when a word such as "up" or "route" is detected from an utterance, it is determined that an utterance corresponding to the category "route search" has been made, and the utterance is connected to a remote language model specialized for route search. But in such a way, for example, "Are you going to be crowded when you go home? When an ambiguous utterance such as "is made", it may be determined that chatting has started.

Figure 1C:
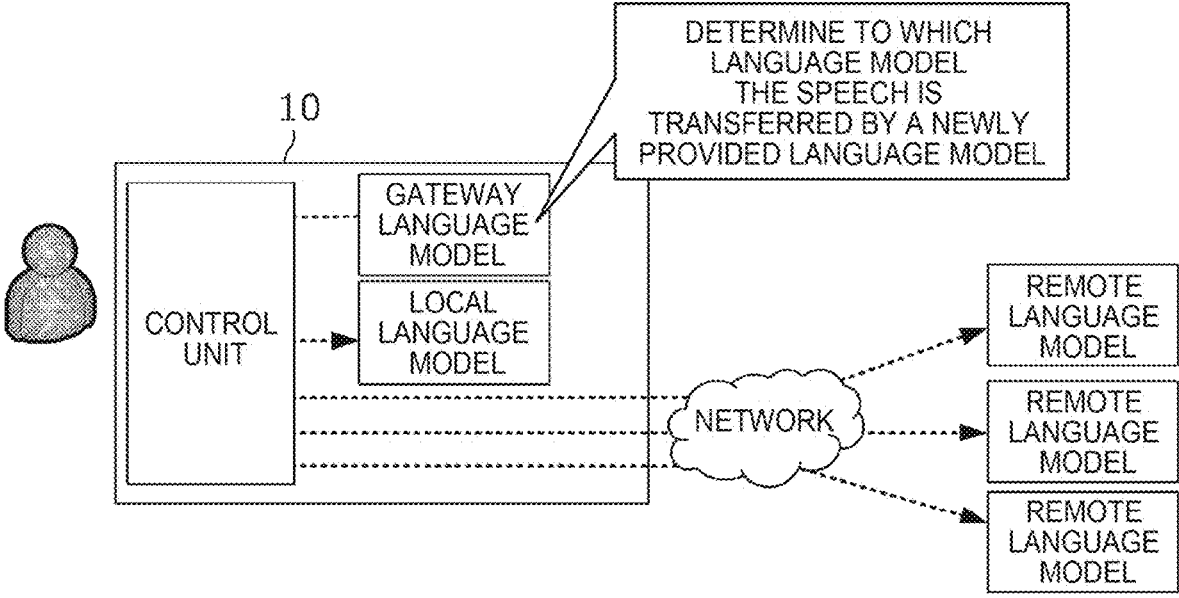
FIG. 1C is a schematic diagram of a dialog system according to a first embodiment.

Therefore, in the in-vehicle device 10 according to the present embodiment, an independent language model is used to determine which language model is to be connected among a plurality of large-scale language models. FIG. 1C is a schematic diagram of the in-vehicle device 10 according to the present embodiment.

The gateway language model is a language model in which an utterance made to the in-vehicle device 10 is input first. When recognizing the utterance, the control unit of the in-vehicle device 10 first inputs the content into the gateway language model. The Gateway Language Model is a generic language model that is not specific to a particular field, but has been learned to the extent that a category of an utterance can be selected from the presented list.

The control unit inputs a list of the language models to the gateway language model along with the content of the acquired utterance, and causes the gateway language model to determine "what is the language model most suitable for the utterance". Further, the control unit transfers the utterance to the language model answered by the gateway language model. This makes it possible to select an appropriate language model from among a plurality of language models and transfer utterances, thereby enabling both cost reduction and accurate dialog to be achieved.

In the description of the present embodiment, the terms "access to a remote language model" and "connection to a remote language model" refer to access or connection to an external device that provides a dialog service using the remote language model. In the present embodiment, a plurality of dialog services each having a remote language model are operated in each of a plurality of external devices, and the in-vehicle device 10 can use the target remote language model by connecting to an arbitrary dialog service.

Hardware Configuration

Figure 2:
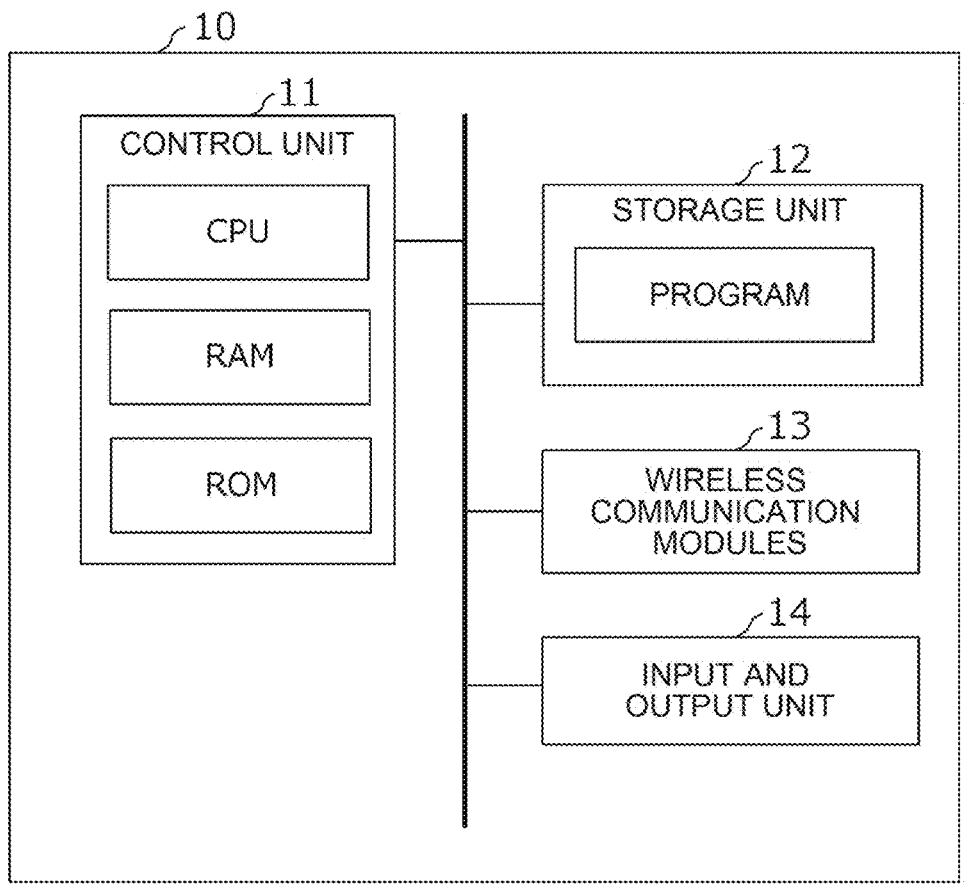
FIG. 2 is a hardware configuration diagram of the in-vehicle device 10.

Next, a hardware configuration of each device constituting the system will be described. FIG. 2 is a diagram schematically illustrating an example of a configuration of hardware included in the in-vehicle device 10 according to the present embodiment.

The in-vehicle device 10 can be configured as a computer including a processor (such as a CPU, GPU), a main storage device (such as a RAM, ROM), and an auxiliary storage device (such as a EPROM, a hard disk drive, and a removable medium). The secondary storage device stores an operating system (OS), various programs, various tables, and the like. By executing the program stored therein, it is possible to realize each function (software module) that meets a predetermined purpose, as will be described later. However, some or all of the functions may be realized as a hardware module by, for example, hardware circuitry such as a ASIC, FPGA.

The in-vehicle device 10 includes a control unit 11, a storage unit 12, a wireless communication module 13, and an input/output unit 14 as hardware.

The control unit 11 is an arithmetic unit that realizes various functions of the in-vehicle device 10 by executing a predetermined program. The control unit 11 can be realized by, for example, a hardware processor such as a CPU. In addition, the control unit 11 may be configured to include a RAM, Read Only Memory (ROM), a cache memory, and the like.

The storage unit 12 is a unit that stores information, and is configured by a storage medium such as a RAM, a magnetic disk, or a flash memory. The storage unit 12 stores a program executed by the control unit 11, data used by the program, and the like.

The wireless communication module 13 is a communication device that performs wireless communication with a predetermined network. In the present embodiment, the wireless communication module 13 is configured to be capable of communicating with a predetermined mobile communication network. The wireless communication module 13 may be configured with an eUICC (e.g., a SIM card). SIM card is configured as a microcomputer including a CPU and a storage device. SIM card is connected to a mobile communication network and stores information to be authenticated.

The input/output unit 14 is a unit that receives an input from a user of the apparatus and presents information to the user. The input/output unit 14 typically includes a device for inputting and outputting sound, such as a microphone and a speaker. The input/output unit 14 may include a device (such as a display) that provides visual information.

Software Configuration

Figure 3:
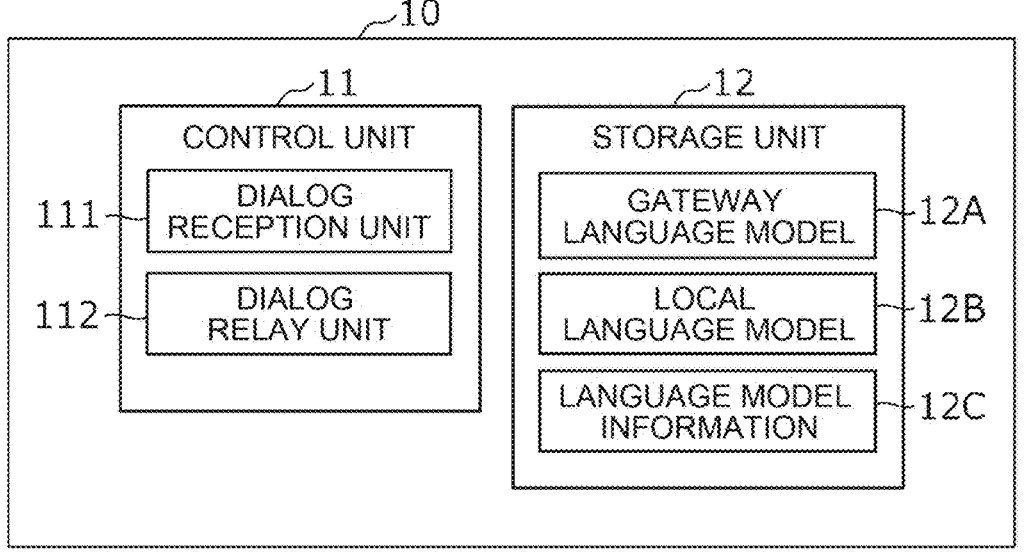
FIG. 3 is a software configuration diagram of the in-vehicle device 10.

Next, the software configuration of each device constituting the system will be described. FIG. 3 is a diagram schematically illustrating a software configuration of the in-vehicle device 10 according to the present embodiment.

In the present embodiment, the control unit 11 included in the in-vehicle device 10 is configured to include two software modules: a dialog reception unit 111 and a dialog relay unit 112. The software modules may be implemented by executing programs stored in the storage unit 12 by a control unit 11 (CPU) or the like. Note that the information processing executed by the software module is synonymous with the information processing executed by the control unit 11 (CPU) or the like.

The dialog reception unit 111 acquires an utterance made by an occupant of the vehicle (hereinafter, also referred to as a user) via an input/output unit 14, which will be described later. The dialog reception unit 111 performs predetermined processing on the acquired voice data, and performs voice recognition. As a result, the content of the utterance is converted into text.

In addition, the dialog reception unit 111 transmits the text obtained as a result of the speech recognition to the dialog relay unit 112. The text is transferred to the target language model by the dialog relay unit 112, which will be described later.

In addition, the dialog reception unit 111 outputs a response (hereinafter referred to as an answer sentence) from the language model transmitted from the dialog relay unit 112. The dialog reception unit 111 converts the answer sentence output by the target language model into a voice, and outputs the voice via the input/output unit 14.

The dialog relay unit 112 determines to which of a plurality of available language models (local language model and remote language model) the text acquired from the dialog reception unit 111 is to be transferred. The dialog relay unit 112 makes an inquiry to the above-described gateway language model, and determines a language model that is a transfer destination of the utterance based on the answer. In addition, the dialog relay unit 112 transfers the utterance to the determined language model, and acquires an answer to the utterance. The acquired answer is transmitted to the dialog reception unit 111.

The storage unit 12 included in the in-vehicle device 10 stores the gateway language model 12A, the local language model 12B, and the language model information 12C. The gateway language model 12A is a language model learned so that a natural language dialog task can be executed. The gateway language model 12A is a language model that is generated at a relatively low-cost, and has not been learned for specific domain-specific dialog. The gateway language model 12A may be a language model for performing a general-purpose conversation. For example, a language model published as an open source may be used as the gateway language model 12A.

The local language model 12B is a language model learned so as to be able to execute a dialog task in a natural language, and is a language model for providing information on a function or a travel of a vehicle. The local language model 12B may be capable of, for example, functional explanation on vehicles on which the in-vehicle device 10 is mounted, route guidance, and the like. The local language model 12B is a lighter language model than a remote language model accessible through a network. By using the local language model 12B, a dialog with a good response can be performed. For example, a remote language model may be used when a professional conversation is required, and a local language model 12B may be used for conversation when a high-speed response is required.

The language model information 12C is a set of information on a plurality of language models available to the in-vehicle device 10. In the present embodiment, a local language model and a plurality of remote language models are exemplified as the plurality of available language models. The language model information 12C may include, for example, an identifier of the language model, a name of the language model, a characteristic of the language model, information regarding an access destination (for example, a network address of an external device that provides the remote language model, and the like). The names and features of the language models may be written in natural language.

Flow of Dialog

Figure 4:
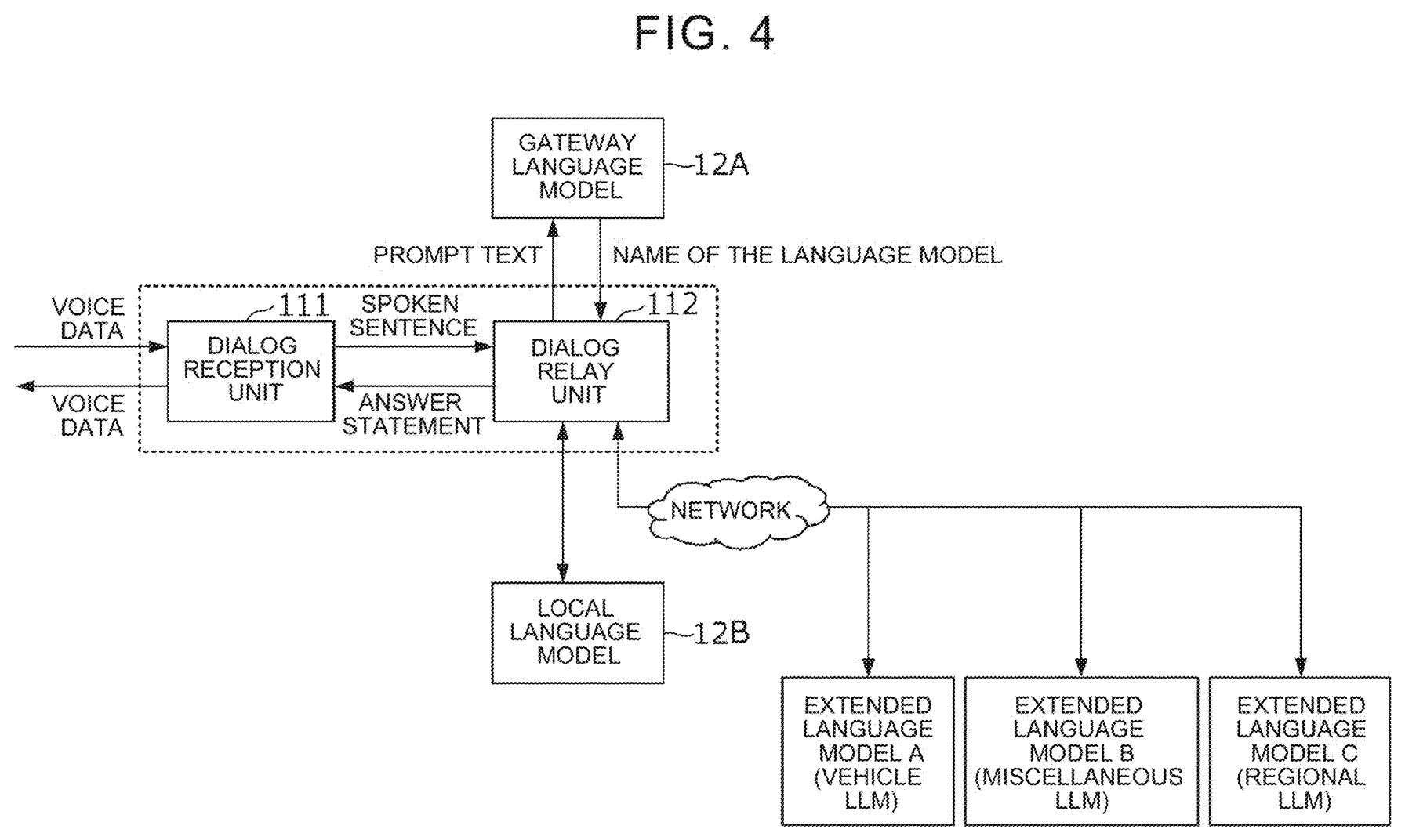

Next, an outline of processing executed by the control unit 11 will be described. FIG. 4 is a diagram illustrating a flow of processing executed by the control unit 11 of the in-vehicle device 10 that has received the utterance from the user.

The dialog reception unit 111 acquires an utterance from the user via the input/output unit 14. For example, the input/output unit 14 converts an utterance acquired via a microphone or the like into voice data, and the dialog reception unit 111 acquires the utterance. The dialog reception unit 111 executes a predetermined speech recognition process on the acquired speech data, and converts the speech data into text. The dialog reception unit 111 transmits the text obtained as a result of the speech recognition to the dialog relay unit 112 while holding the response to the utterance. The text is hereinafter referred to as "utterance sentence".

Upon receiving the utterance sentence, the dialog relay unit 112 determines to which language model the utterance sentence is to be transferred by making an inquiry to the gateway language model 12A. First, the dialog relay unit 112 generates a question sentence (hereinafter, referred to as a prompt text) for inquiring the gateway language model 12A. The prompt text includes a sentence that queries the gateway language model 12A for an appropriate language model as a destination to which the spoken sentence is forwarded.

The prompt text includes a list of spoken sentences and available language models. FIG. 5A is an exemplary prompt text. Here, it is assumed that the following language models are available.

(1) Vehicle LLM

Language models that enable you to grasp the in-vehicle conditions and set in-vehicle equipment. The owner's manual of the vehicle has been learned, and information on the functions of the vehicle can be provided.

(2) Chat LLM

A language model that specializes in non-task-oriented speech.

(3) Regional Intelligence LLM

Language models that can provide information on surrounding areas, including tourism guides.

(4) Local LLM

A language model (local language model 12B) that deals with topics that do not apply to (1) through (3) above.

The prompt text includes the names of these language models and a description of the characteristics of each language model in natural language. The names and features of the respective language models may be obtained from the language model information 12C. Further, the prompt text includes a sentence for inquiring which language model is appropriate as an input destination of the utterance sentence. For example, the prompt text includes a request for outputting a name of an appropriate language model as shown in FIG. 5A.

The dialog relay unit 112 inputs the generated prompt text into the gateway language model 12A and acquires a response. In the example of FIG. 5A, the gateway language model 12A interprets the utterance as a category of "questioning the vehicle" and outputs the answer "vehicle LLM." In the illustrated example, the name of the language model is answered, but the target language model may be specified by an identifier or the like. Further, in the present embodiment, the names and features of the respective language models are included in the prompt text, but the gateway language model 12A may hold the information in advance.

Secondly, the dialog relay unit 112 forwards the utterance sentence to the language model answered by the gateway language model 12A. When the target language model is the local language model 12B, the dialog relay unit 112 transmits the uttered sentence in the own device. When the target language model is a remote language model, that is, a language model accessible via a network, the dialog relay unit 112 transfers the uttered sentence to an external device that provides the target language model via the network.

The language model into which the utterance sentence is input outputs a response in response to the utterance sentence. FIG. 5B is an exemplary response to an utterance sentence. In the present embodiment, the vehicle LLM that has received the inquiry about the vehicle outputs a response.

Upon receiving the response from the language model to which the utterance sentence has been transferred, the dialog relay unit 112 transmits the text (hereinafter referred to as the answer sentence) included in the response to the dialog reception unit 111. Upon receiving the answer sentence, the dialog reception unit 111 generates voice data based on the answer sentence and outputs the voice data via the input/output unit 14. Note that the dialog reception unit 111 may generate only voice data for reading out the answer sentence, or may generate information associated with the voice data. Examples of the information associated with the voice data include a user interface screen. The user interface screen may include an answer sentence written in text. The dialog system according to the present embodiment seamlessly performs a series of processes illustrated in FIG. 4. As a result, it is possible to obtain an effect of having dialog with the in-vehicle device 10 when viewed from the user who has made the utterance.

Flowchart

Figure 6:
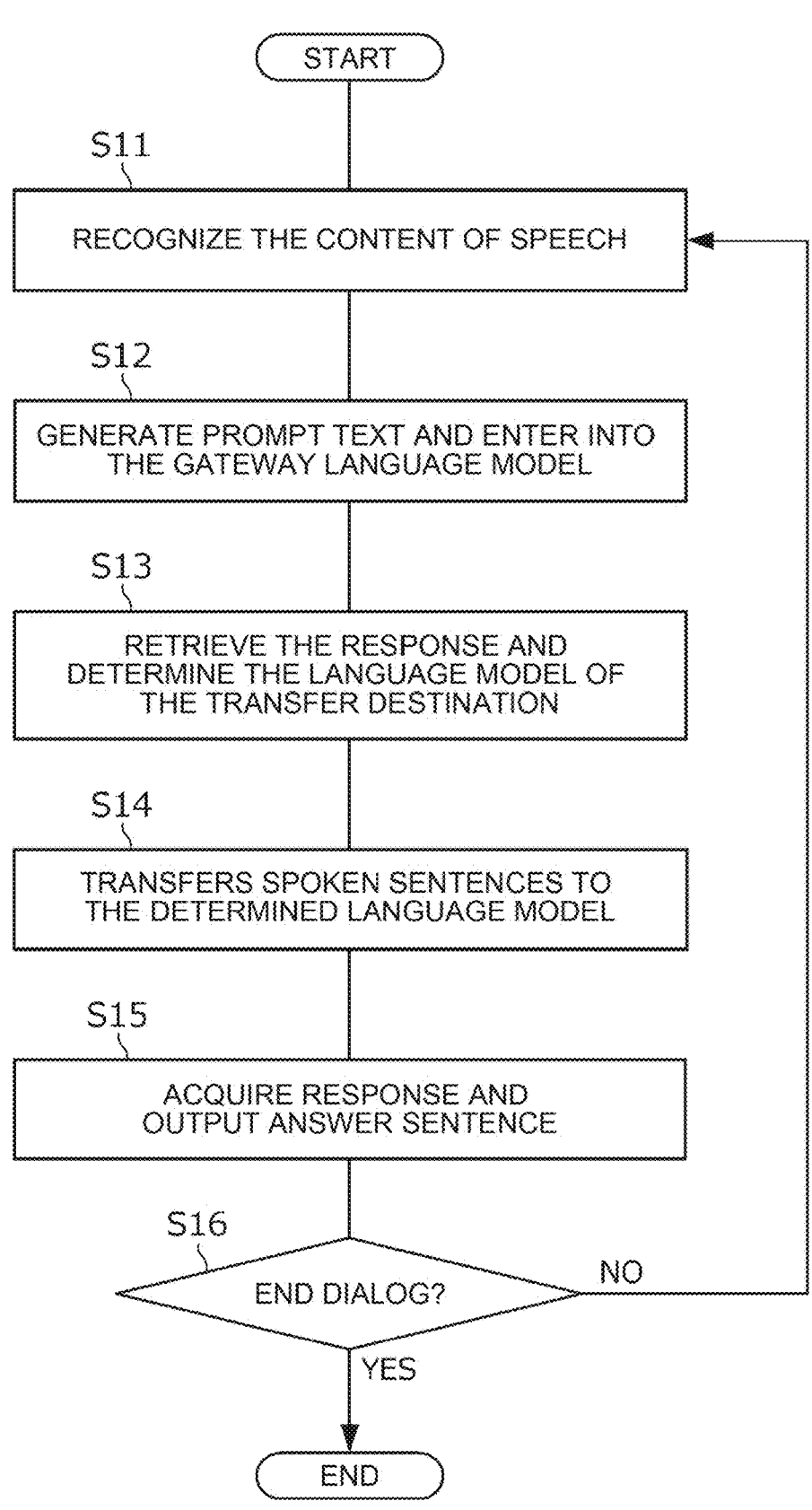
FIG. 6 is a flowchart of processing executed by the control unit 11 of the in-vehicle device 10.

Next, details of processing executed by the in-vehicle device 10 will be described. FIG. 6 is a flowchart of processing executed by the in-vehicle device 10. The process illustrated in FIG. 6 is started when an utterance is made by a user (an occupant of the vehicle). The start of the utterance may be detected by, for example, a predetermined keyword.

First, in S11, the dialog reception unit 111 recognizes the content of the utterance. The dialog reception unit 111 acquires the voice data output from the input/output unit 14, and converts the utterance into text by executing the voice recognition process. The converted text (utterance sentence) is transmitted to the dialog relay unit 112.

In S12, the dialog relay unit 112 generates prompt text. As discussed above, the prompt text includes a list of spoken sentences and available language models. The list of language models includes a name of the language model and a description of features of each language model in natural language. The name of the language model and the features of the respective language models can be obtained from the language model information 12C. Further, as illustrated in FIG. 5A, the prompt text includes a sentence inquiring which language model is appropriate as a language model for inputting an utterance sentence. The generated prompt text is inputted to the gateway language model 12A by the dialog relay unit 112.

Next, in S13, the dialog relay unit 112 acquires a response from the gateway language model 12A. As shown in FIG. 5B, a language model to which the uttered sentence is to be transferred is shown from the gateway language model 12A. The dialog relay unit 112 determines to which language model the utterance sentence is to be transferred based on the response.

In S14, the dialog relay unit 112 transmits the utterance sentence to the language model determined by S13. When the target language model is a local language model, the dialog relay unit 112 transfers the uttered sentence in the device. When the target language model is a remote language model, the dialog relay unit 112 transfers the utterance sentence to the language model by accessing an external device that provides the target language model via the wireless communication module 13.

In S15, the dialog relay unit 112 acquires a response from the target language model, and transmits the answer sentence included in the response to the dialog reception unit 111. The dialog reception unit 111 generates voice data based on the answer sentence and outputs the voice data via the input/output unit 14. The dialog reception unit 111 may convert the answer sentence into speech data by a speech synthesis technique. The audio data is output via the input/output unit 14 (speaker or the like) and provided to the user.

In S16, the dialog reception unit 111 determines whether the dialog between the user and the language model has ended. For example, the dialog reception unit 111 may determine that the dialog has ended when there is no utterance for a predetermined period or longer after the answer is outputted by S15 through the sound or when an utterance for terminating the dialog is made (for example, when a predetermined keyword is detected). If it is determined in this step that the dialog has ended, the process ends. If it is determined that the dialog has not ended, the process returns to S11.

When the second and subsequent utterances are made, the dialog relay unit 112 may change the contents of the processing illustrated in FIG. 6 depending on whether or not the utterance continues from the previous utterance. For example, a plurality of utterances may be made in the process of the dialog. In this case, if the subsequent utterances belong to the same category (domain), the dialog relay unit 112 does not need to make an inquiry to the gateway language model 12A every time. Therefore, the dialog relay unit 112 may omit the inquiry to the gateway language model 12A (the process of S13 from S12) as long as the domain of the dialog is not changed. In the series of dialogs, whether or not the domain of the dialog has changed may be detected by a known method. For example, when a predetermined keyword is detected from an utterance or when a user performs a predetermined operation, it may be determined that the domain of the dialog has changed.

As described above, the in-vehicle device 10 according to the present embodiment uses the gateway language model to determine which language model the utterance performed by the occupant of the vehicle should be transferred to. This makes it possible to use a plurality of language models capable of handling topics with high expertise without comprehensively defining matching between the utterance content and the language model. In particular, by using the language model learned at a relatively low cost as the gateway language model, the cost of the in-vehicle device 10 can be reduced.

MODIFIED EXAMPLES

The above-described embodiments are merely examples, and the present disclosure may be appropriately modified and implemented without departing from the scope thereof. For example, the processes and means described in the present disclosure can be freely combined and implemented as long as no technical contradiction occurs.

Further, in the embodiment, the remote language model is arranged in an external device connected to the Internet, but the remote language model may be arranged in another device. For example, a remote language model may be placed on an edge server accessible from the vehicle. The remote language model may be distributed among a plurality of edge servers and clouds.

Although the in-vehicle device is exemplified in the embodiment, the information processing device according to the present disclosure can also be implemented as a device or a device that is not in-vehicle.

Note that the remote language model may be arranged in a plurality of edge servers or the like. In this case, the in-vehicle device 10 may acquire the position information of the own vehicle, and identify the edge server in which the target language model is arranged based on the position information. For example, a remote language model for providing regional information may be arranged in a plurality of edge servers arranged for each region. In this instance, it is assumed that, for example, the gateway language model 12A has answered "regional information LLM". In this case, the in-vehicle device 10 may identify the region information LLM arranged in the edge server that is the closest geographically based on the position information of the host vehicle. The regional information handled by the remote language model may be different for each edge server. For example, a language model that provides the area information of the area A may be arranged in the edge server arranged in the area A, and a language model that provides the area information of the area B may be arranged in the edge server arranged in the area B. The in-vehicle device 10 identifies an edge server (or a region information LLM provided by the edge server) corresponding to an area in which the own vehicle is located, and accesses the region information LLM provided by the edge server. As a result, the area information of the area can be obtained.

In addition, the same language model may be distributed among a plurality of apparatuses such as a local machine, an edge server, and a cloud server. The in-vehicle device 10 may determine which device is to be accessed based on a predetermined requirement when the language model determined by S13 is available in a plurality of devices. For example, in an environment in which a high-speed response is required, it may be preferable to connect to an edge server rather than a cloud server. In addition, when resources of a local machine are insufficient, it may be preferable to use a language model provided in an external device.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EE-PROM), a magnetic card, a flash memory, an optical card, and any type of medium suitable for storing electronic commands.

What is claimed is:

1. An information processing device, comprising: a control unit that executes recognizing content of an utterance made by a user, generating a prompt text including a list of a plurality of first language models respectively specialized for intention understanding in a plurality of predetermined domains, and the content of the utterance, inputting the prompt text into a second language model, and identifying the first language model possessing a domain corresponding to the content of the utterance, based on content of a response obtained from the second language model, and transferring the content of the utterance to the first language model that is identified.

2. The information processing device according to claim 1, wherein the list included in the prompt text includes a sentence describing a domain in which each of the first language models is specialized, in natural language.

3. The information processing device according to claim 2, wherein the prompt text includes a sentence inquiring, by natural language, regarding which of the first language models possesses a domain corresponding to the content of the utterance.

4. The information processing device according to claim 1, wherein the first language model and the second language model are language models trained to perform dialog tasks by natural language.

5. The information processing device according to claim 1, wherein the control unit outputs a response obtained from the first language model, to which the content of the utterance was transferred, as a response to the utterance.

* * * * *